US012488697B2

(12) United States Patent
Costas Alvarez et al.

(10) Patent No.: US 12,488,697 B2
(45) Date of Patent: Dec. 2, 2025

(54) METHODS AND APPARATUS FOR MONITORING AIRCRAFT DESCENT RATES

(71) Applicant: THE BOEING COMPANY, Chicago, IL (US)

(72) Inventors: Pablo Costas Alvarez, Madrid (ES); Javier Lopez Leones, Madrid (ES); Luis Pedro D'Alto, Madrid (ES); Ruben Vega Astorga, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 460 days.

(21) Appl. No.: 17/955,134

(22) Filed: Sep. 28, 2022

(65) Prior Publication Data

US 2024/0105069 A1  Mar. 28, 2024

(51) Int. Cl.
*G08G 5/72* (2025.01)
*G08G 5/22* (2025.01)

(52) U.S. Cl.
CPC ............... *G08G 5/727* (2025.01); *G08G 5/22* (2025.01)

(58) Field of Classification Search
CPC ... G08G 5/0082; G08G 5/0026; G08G 5/0013
See application file for complete search history.

(56) References Cited

U.S. PATENT DOCUMENTS

| | | | |
|---|---|---|---|
| 4,189,777 A * | 2/1980 | Kuntman | G01C 5/005 701/5 |
| 5,781,126 A * | 7/1998 | Paterson | G05D 1/0607 701/4 |
| 8,958,931 B2 | 2/2015 | Baker et al. | |
| 10,577,123 B1 * | 3/2020 | Kirtz | G08G 5/025 |
| 10,672,204 B2 | 6/2020 | Chopra et al. | |
| 11,262,211 B2 * | 3/2022 | Youssef | G08G 5/0086 |
| 2003/0225492 A1 | 12/2003 | Cope et al. | |
| 2006/0265109 A1 | 11/2006 | Canu-Chiesa et al. | |

(Continued)

FOREIGN PATENT DOCUMENTS

CN   114692760 A  *  7/2022

OTHER PUBLICATIONS

Machine translation of CN114692760 (Year: 2022).*

(Continued)

*Primary Examiner* — Anne Marie Antonucci
*Assistant Examiner* — Patrick Daniel Mohl
(74) *Attorney, Agent, or Firm* — Josef L. Hoffmann; The Small Patent Law Group LLC

(57) ABSTRACT

A system that includes an ingress module arranged to receive flight data having a descent rate value and an altitude value. The system also has a data store with descent rate threshold values of at least one aircraft model. The descent rate threshold values are associated, in the data store, with pressure altitude values. The system also includes a descent classification module that is operably coupled to the ingress module and the data store. The descent classification module is adapted to compare the descent rate value with the descent rate threshold values. The system additionally includes an alert module adapted to provide, in response to the descent classification module comparing the descent rate value that exceeds at least one of the descent rate threshold values, an alert signal to a graphic user interface that is operably coupled to the alert module.

25 Claims, 11 Drawing Sheets

(56) References Cited

U.S. PATENT DOCUMENTS

| | | | | |
|---|---|---|---|---|
| 2010/0090867 | A1* | 4/2010 | Christophe | G01W 1/00 340/970 |
| 2012/0232723 | A1* | 9/2012 | Nance | B64C 25/00 701/5 |
| 2013/0218374 | A1* | 8/2013 | Lacko | G08G 5/0021 701/16 |
| 2014/0249737 | A1* | 9/2014 | Meunier | G08G 5/04 701/120 |
| 2015/0170523 | A1* | 6/2015 | La Civita | G08G 5/0095 701/120 |
| 2016/0102994 | A1* | 4/2016 | Brenner | G07C 5/0808 701/7 |
| 2016/0288922 | A1* | 10/2016 | He | G01C 23/00 |
| 2016/0379500 | A1* | 12/2016 | Garrido López | G08G 5/0039 701/16 |
| 2017/0063944 | A1* | 3/2017 | Nyikos | H04B 7/18508 |
| 2017/0110018 | A1 | 4/2017 | Wang et al. | |
| 2018/0155052 | A1 | 6/2018 | Lacroix et al. | |
| 2019/0122569 | A1* | 4/2019 | Villele | G01C 23/00 |
| 2019/0127082 | A1* | 5/2019 | Oltheten | B64D 43/00 |
| 2019/0162555 | A1* | 5/2019 | Youssef | B64D 43/00 |
| 2019/0213890 | A1* | 7/2019 | Hosamani | B64D 45/08 |
| 2020/0258404 | A1* | 8/2020 | Thompson | G05D 1/0676 |
| 2020/0333805 | A1* | 10/2020 | English | G05D 1/654 |
| 2021/0082295 | A1* | 3/2021 | Surace | G08G 5/0013 |
| 2022/0015102 | A1* | 1/2022 | Gallagher | H04B 7/15542 |
| 2022/0139234 | A1* | 5/2022 | Chaubey | G08G 5/0091 701/121 |
| 2022/0144448 | A1* | 5/2022 | Greene | B64D 43/02 |
| 2022/0317705 | A1* | 10/2022 | Zhang | G08G 5/0069 |
| 2022/0358696 | A1* | 11/2022 | Holder | G08G 5/025 |
| 2023/0316931 | A1* | 10/2023 | Ryan | B64D 43/02 701/7 |
| 2024/0019875 | A1* | 1/2024 | Consiglieri Pedroso Mendes Dias | G08G 5/045 |

OTHER PUBLICATIONS

Jesper Bronsvoort, Trang Huynh and Gabriele Enea, "An operator-Focussed Metric for Measuring Predictability and Efficiency of Descent Operations", 10.2514/6.2016-4219, 2016. [Abstract Only].

Trang Huyunh, Aleysha Thomas and Jesper Bronsvoort, "ANSP Measures of Flight Descent Performance", 11th SESAR Innovation Days, 2021.

W. Li, L. Yang, Y. Chen, H. Zhang and Z. Zhao, "Multi-Objective Optimization of CDO Trajectory in a Flexible Airspace Structure," 2020 Integrated Communications Navigation and Surveillance Conference (ICNS), 2020, pp. 3C3-1-3C3-15. [Abstract Only].

Raghavender V., Rambabu Mokati, Anil Kumar. V and H. Jeevan Rao, "Simulation of Enhanced Ground Proximity Warning System using VHDL," International Journal of Current Engineering and Technology, 2014.

Gordon G. Cable and Roderick Westerman, "Hypoxia Recognition Training in Civilian Aviation: A Neglected Area of Safety?", JASAM vol. 5: No. 1—Aug. 2010.

Bason R and Yacavone DW. Loss of cabin pressurisation in US Naval aircraft: 1969-1990. Aviat Space Environ Med. 1992;63(5):341-5. [Abstract Only].

Brooks CJ. Loss of cabin pressure in Canadian Forces transport aircraft, 1963-1984. Aviat Space Environ Med. 1987; 58(3):268-75. [Abstract Only].

Newman, DG., Depressurisation accidents and incidents involving Australian civil aircraft. Jan. 1, 1975 to Mar. 31, 2006., in ATSB Research and Analysis Report. 2006, Australian Transport Safety Bureau.

Angela Nuic, Damir Poles and Vincent Mouillet, BADA: An advanced aircraft performance model for present and future ATM systems. European Organisation for the Safety of Air Navigation, Eurocontrol, Bretigny/Orge, France 2010.

European Patent Office, Extended European Search Report for European Patent Application No. 23194438.0, mailed Mar. 5, 2024.

\* cited by examiner

METHODS AND APPARATUS FOR MONITORING AIRCRAFT DESCENT RATES

FIELD

Aspects of the present disclosure relate to flight data processing, including processing descent data.

BACKGROUND

Aircraft, satellites, and other fight data sources equipped with ADS-B (Automatic Dependent Surveillance-Broadcast) periodically broadcast (e.g., every second) relevant flight data such as an aircraft's identification (ID), pressure altitude, and vertical rate. ADS-B uses GPS signals along with aircraft avionics to transmit an aircraft's location from an on-board transceiver to receivers located on the ground. The receivers then transmit that information to air traffic controllers, ADS-B data aggregators, and cockpit displays of other aircraft equipped with ADS-B avionics.

This information is aggregated, filtered, and streamed by ADS-B services, which operate international networks of ADS-B receivers that track ADS-B-equipped aircraft, thereby providing real-time or near real-time flight tracking information. However, given that the data cumulatively includes periodically reported data points (e.g., location, airspeed, altitude) regarding aircraft located around the world, the sheer volume of the data is difficult to manage, much less derive meaningful information from. Thus, the task of transmitting and processing this information for subsequent use, such as for presentation to users, is challenging. A brute-force approach to processing this massive amount of data on a continuous basis is prohibitive from both a bandwidth and processing-resources perspective. Accordingly, the present invention solves a number of these problems as well as other problems present in the aviation information industry, as detailed below.

SUMMARY

The present disclosure provides a method in one aspect, the method including receiving, by an ingress module, automatic dependent surveillance-broadcast ("ADS-B") data including an aircraft ID, a descent rate value, and a measured pressure altitude value; comparing, by a descent classification module, at least the descent rate value with a descent rate threshold value that is associated, in a data store, with the aircraft ID and a pressure altitude value, the descent rate threshold value based on an aircraft mass value and an aircraft speed value; and providing, by an alert module and based on the comparing step, an alert signal for a graphic user interface ("GUI").

In one aspect, in combination with any example method above or below, the descent rate threshold value includes at least one of a rate-of-climb threshold value and a rate-of-descent threshold value. In one aspect, in combination with any example method above or below, the providing step includes providing, in response to at least the descent rate value exceeding the descent rate threshold value, the alert signal for the GUI.

In one aspect, in combination with any example method above or below, the providing step includes providing, in response to the descent rate data equaling or exceeding the descent rate threshold value, the alert signal for the GUI. In one aspect, in combination with any example method above or below, the method includes selecting, from the data store, the descent rate threshold value based on the aircraft ID and the measured pressure altitude value.

In one aspect, in combination with any example method above or below, the providing step includes providing, in response to the comparing step, at least one of a visual alert signal and an auditory alert signal for the GUI. In one aspect, in combination with any example method above or below, the providing step includes providing, in response to the comparing step, at least one of the visual alert signal and the auditory alert signal having a variable parameter with respect to a degree that the descent rate value exceeds the descent rate threshold value.

In one aspect, in combination with any example method above or below, the method includes displaying, by a display unit, a map and the providing step including providing, by the alert module, a visual alert that is displayed with the map.

In one aspect, in combination with any example method above or below, the ADS-B data further includes location data and the providing step including providing, by the alert module, the visual alert that is displayed at a location of the map that corresponds to the location data.

In one aspect, in combination with any example method above or below, the method includes displaying, by a display unit, a flight track based on the ADS-B data and the providing step including providing, by the alert module, a visual alert that is displayed along the flight track.

In one aspect, in combination with any example method above or below, the receiving step includes receiving, by the ingress module, the ADS-B data including the aircraft ID, the descent rate value, measured pressure values, and timestamp values, the measured pressure values associated with the timestamp values and the method further including calculating, by a descent value determination module and based on the measured pressure values, a corrected descent rate value based on the measured pressure values associated with the timestamp values; and selecting, by the descent value determination module, the descent rate value or the corrected descent rate value based on a difference value between the descent rate value and the corrected descent rate value, wherein the comparing step includes comparing, in response to the selecting step selecting the corrected descent rate value, the corrected descent rate value with the descent rate threshold value.

In one aspect, in combination with any example method above or below, the receiving step includes receiving, by the ingress module, an ADS-B data stream including the ADS-B data associated with a plurality of flights, the ADS-B data including aircraft IDs that each identify an aircraft model, descent rate values, and measured pressure altitude values, the comparing step includes comparing, by the descent classification module, at least the descent rate values with descent rate threshold values that are associated, in the data store, with a respective aircraft ID and pressure altitude values.

In one aspect, in combination with any example method above or below, the pressure altitude values, associated with the respective aircraft ID, include a range that includes at least one of a ceiling altitude value and a depressurized aircraft threshold altitude value. In one aspect, in combination with any example method above or below, the descent rate threshold values, associated with the respective aircraft ID, are calculated based at least on a descent rate schedule of the aircraft model for altitudes of ten-thousand feet or higher.

In one aspect, in combination with any example method above or below, the aircraft mass value is below a pre-defined maximum takeoff weight of an aircraft model and above a pre-defined operating empty weight of the aircraft model.

In one aspect, in combination with any example method above or below, the comparing step includes comparing at least the descent rate value with one or more descent rate threshold values that are calculated based at least on the aircraft mass value and aircraft speed values that characterize a descent of an aircraft model that corresponds to the aircraft ID. In one aspect, in combination with any example method above or below, the comparing step includes comparing at least the descent rate value with one or more descent rate threshold values that are calculated based at least on one of the aircraft speed value that characterizes a maximum operating speed of an aircraft model, and the aircraft mass value that characterizes a weight of the aircraft model after at least a takeoff procedure.

In one aspect, in combination with any example method above or below, the comparing step includes comparing at least the descent rate value with one or more descent rate threshold values that are calculated based at least on the aircraft mass value that characterizes a payload weight that is lighter than a maximum payload capacity weight of an aircraft model.

In one aspect, in combination with any example method above or below, the comparing step includes comparing at least the descent rate value with one or more descent rate threshold values that are calculated based at least on a descent rate schedule of an aircraft model for altitudes of ten-thousand feet or higher. In one aspect, in combination with any example method above or below, the descent rate threshold value includes at least one of a normal descent rate threshold and an excessive descent rate threshold.

In one aspect, in combination with any example method above or below, the method includes storing, based on the comparing step and in the data store, at least one of normal descent rate occurrence data and excessive descent rate occurrence data.

In one aspect, in combination with any example method above or below, the comparing step includes comparing, by the descent classification module, at least the descent rate value with a normal descent rate threshold value and an excessive descent rate threshold value that are each associated, in the data store, with the aircraft ID and the pressure altitude value, the normal descent rate threshold value based on a normal descent rate value and the excessive descent rate threshold value based on an excessive descent rate value.

In one aspect, in combination with any example method above or below, the method includes storing, based on the comparing step and in the data store, at least one of normal descent rate occurrence data, intermediate descent rate occurrence data, and excessive descent rate occurrence data.

The present disclosure provides a system in one aspect, the system including an ingress module arranged to receive at least a data stream of ADS-B data of a plurality of flights, the ADS-B data including reported aircraft IDs, descent rate values, and reported pressure altitude values; a data store, the data store including aircraft IDs that each identify a respective aircraft model, each of the aircraft IDs associated, in the data store, with descent rate threshold values of the respective aircraft model, the descent rate threshold values associated, in the data store, with pressure altitude values; a descent classification module operably coupled to the ingress module and the data store and adapted to compare at least the descent rate values with corresponding descent rate threshold values that are associated, in the data store, with the aircraft IDs that correspond to the reported aircraft IDs and the pressure altitude values that correspond to the reported pressure altitude values; and an alert module operably coupled to the descent classification module and adapted to provide, in response to the descent classification module comparing at least one of the reported descent rate values that exceeds at least one of the corresponding descent rate threshold values, an alert signal for a graphic user interface.

The present disclosure provides a system in one aspect, the system including an ingress module arranged to receive flight data including a descent rate value and an altitude value; a data store including descent rate threshold values of at least one aircraft model, the descent rate threshold values associated, in the data store, with pressure altitude values that include a pressure altitude value; a descent classification module that is operably coupled to the ingress module and the data store and adapted to compare the descent rate value with at least one of the descent rate threshold values that is associated, in the data store, with the pressure altitude value that corresponds to the altitude value; an alert module adapted to provide, in response to the descent classification module comparing the descent rate value that exceeds the at least one of the descent rate threshold values, an alert signal to a graphic user interface; and the graphic user interface operably coupled to the alert module.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to flight data processing, including processing flight descent data. Extreme descent rates by aircraft are typically an indicator of anomalies in a flight, including emergency procedures following a cabin depressurization. A descent emergency procedure may include an aircraft descending rapidly to a flight level with enough natural oxygen concentration for the crew and the passengers (e.g., to a depressurized aircraft threshold altitude value of around 10,000 feet). This descent should not exceed the maximum speed allowed within the operational envelope of an aircraft, which is specific to an aircraft model and its configuration.

There is no known solution in the market that monitors in real or near-real time flights that are performing rapid descents or similar maneuvers, particularly without knowledge of a flight's aircraft mass, engine model, and/or local ambient temperature, which is currently not included in ADS-B data.

One innovative insight is that the aircraft-specific maximum takeoff weight and (minimum) operating empty weight values that are provided by commercial aircraft performance databases typically encompass edge cases that rarely occur in commercial settings. In one aspect, particular weight scenarios are determined and used for calculating aircraft-specific descent rate threshold values for a range of pressure altitudes. In one aspect, descent rate threshold values are calculated independently of temperature variations.

By utilizing, in a data store, one or more aircraft-specific descent rate threshold values, a flight data processing system can quickly (e.g., in real time or near-real time) and accurately identify aggressive in-flight descents and alert crew, traffic controllers, and/or other human operators of such descents. For example, in one aspect, such flight data processing systems can process large amounts of aggregated flight information of a continuous data stream in a computationally efficient manner, which can save power for operating the computing resources as well as reduce memory usage. Further, in one aspect, such flight data processing systems can accurately classify aggressive descents based on ADS-B data, which does not include actual (inflight) aircraft weight, local ambient temperatures that an aircraft is operating under, and intermittently erroneous descent rate/vertical speed values. Such classifications can further provide meaningful post-flight data that characterizes cumulative descent data of particular flights, airlines, and/or aircraft models.

Figure 1:
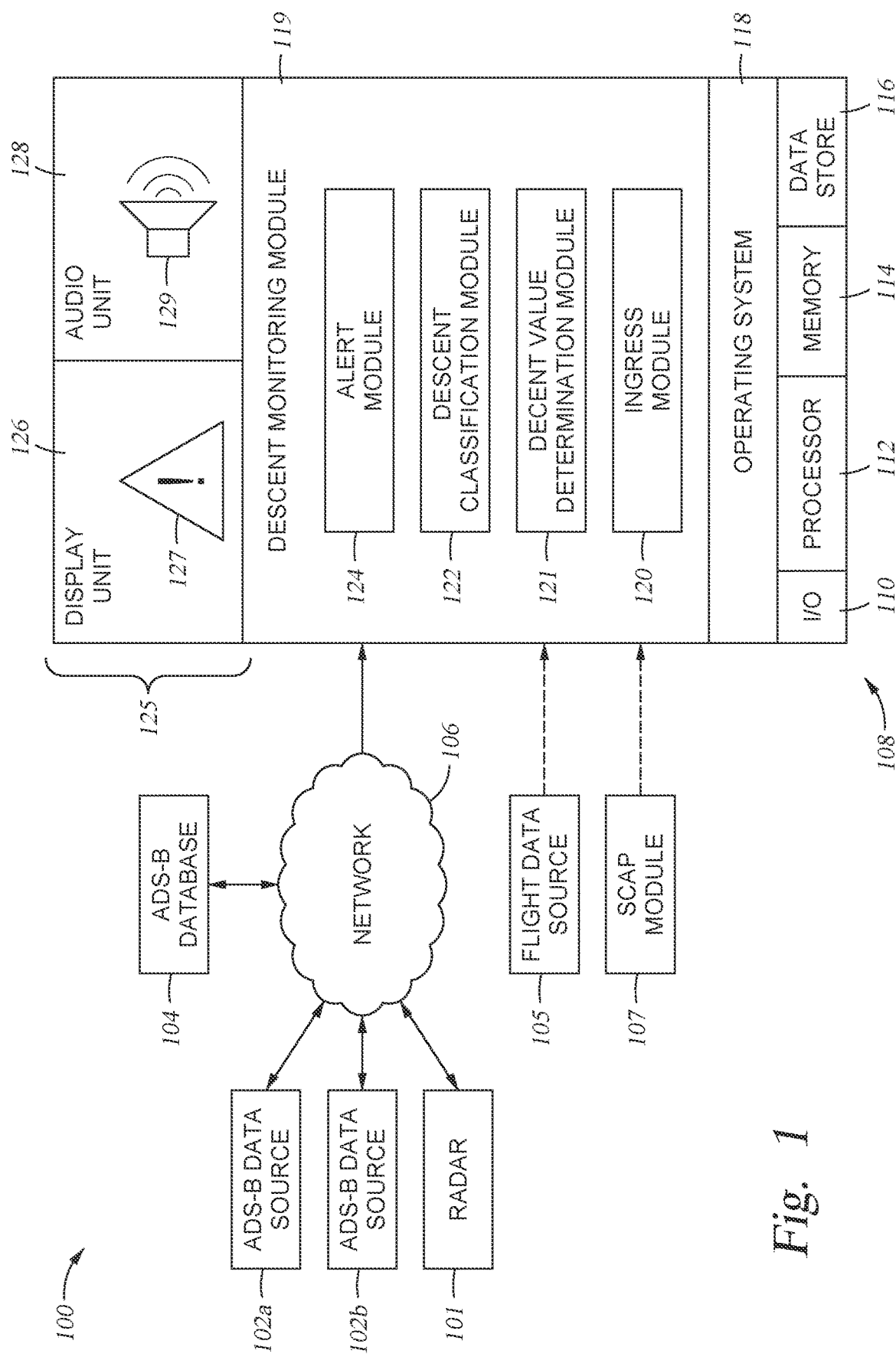
FIG. 1 depicts examples of a flight data processing system.

FIG. 1 depicts examples of flight data processing system 100, which shows flight data being generated from radar 101, ADS-B data sources 102a and 102b, ADS-B database 104, flight data source 105, and Standard Computerized Airplane Performance (SCAP) module 107.

ADS-B data source 102a and 102b may include one or a combination of ground ADS-B receivers, ADS-B equipped aircraft, and/or communication satellites. In one aspect, ADS-B database 104 is operably coupled to network 106 for aggregating flight data from a plurality of ADS-B data sources 102a and 102b. Network 106 may include a wireless or wired Local Area Network (LAN), Municipal Area Network (MAN), Wide Area Network (WAN), such as the Internet, a combination of these, among other network arrangements (e.g., an ADS-B network).

In one aspect, after aggregating and filtering the flight data, ADS-B database 104 may then stream the aggregated, filtered flight data for a plurality of flights, potentially including all or a majority of commercial flights, which are providing flight data, in a given area, country, or globally. Additionally or alternatively, flight data may come from flight data source 105, which may be directly operably coupled to descent monitoring system 108 or via an intermediate network such as network 106 or an alternative network (e.g., a private LAN). Flight data source 105 may include one or more of the above-mentioned flight data sources such as radar 101, ADS-B data source 102a and/or 102b, and/or ADS-B database 104. In radar aspects, flight data may include an aircraft altitude as determined by radar 101 (e.g., a measured altitude). In one aspect, altitudes from non-ADS-B surveillance sources (e.g., radar 101) may be converted to a pressure altitude.

In one aspect, flight data source 105 may include one or more communication satellites. In one aspect, flight data source 105 may include an Aircraft Situation Display to Industry Service (ASDI) server, which may be part of the ASDI provided by the Federal Aviation Administration (FAA). In one aspect, flight data source 105 may provide historic flight data for post-flight processing by system 108.

In one aspect, SCAP module 107 is arranged onboard an aircraft and providing the aircraft flight data to system 108, which may also reside onboard the aircraft.

In one aspect, descent monitoring module 119 includes ingress module 120, descent value determination module 121, descent classification module 122, and alert module 124. As will be further detailed, ingress module 120 receives flight data that characterizes one or a plurality of flights and descent classification module 122 may utilize one or more of an aircraft ID (e.g., ICAO or IATA codes), a descent rate (e.g., rate of climb/descent values), and pressure altitude value(s).

Ingress module 120 may provide, for example, a received descent rate and pressure altitude data to descent classification module 122. Alternatively, ingress module 120 may provide the received descent rate and at least two received pressure altitudes respectively associated with received ADS-B timestamp values to optional descent value determination module 121.

Module 121 may calculate, based on the pressure altitudes and associated timestamp value, a descent rate to compare to the received descent rate. Given that received descent rates can be intermittently inaccurate, in one aspect, module 121 determines a difference between the received descent rate and the corrected descent rate. If the difference indicates an inaccurate received descent rate (e.g., a negative or positive value of at least a pre-determined magnitude), module 121 may select the corrected descent rate for descent classification module 122. In one aspect, descent classification module 122 may utilize descent rates calculated by descent value determination module 121 without comparing the corrected descent rates to a received descent rate. In one aspect, descent value determination module 121 may not be included or utilized by system 108.

Based on either the received or corrected descent rate and the associated received pressure altitude data, module 122 may, in one aspect, select and compare a descent rate threshold value with the received or corrected descent rate value. In one aspect, alert module 124, in response to the descent rate value exceeding the descent rate threshold value, provides an alert signal for (optional) user interface 125. In one aspect, the alert signal may include an audio signal (e.g., an auditory alert signal), an image signal, a video signal, or a combination thereof (e.g., both auditory and visual alert signals). As seen in FIG. 1, display unit 126 displays visual alert 127 and audio unit 128 (e.g., a speaker) provides audio alert 129. In one aspect, user interface 125 includes a graphic user interface (GUI).

In one aspect, a parameter of the alert signal is modified or otherwise changed based on a degree that the received descent rate value exceeds the descent rate threshold value. In audio alert aspects, the variable parameters may include one or more of audio frequency and volume. In visual alert aspects, variable parameters may include color, saturation, and/or hue, alert image size, alert video size, among other examples.

System 108 may further include I/O 110, processor 112, memory 114, data store 116, and operating system 118. As described in more detail, data store 116 may include tables, look up tables, databases, and other organized data that includes the descent rate threshold value(s) and/or descent data with descent classification data. For example, data store 116 may include descent rate threshold database 116a of FIG. 3 and/or flight descent rate database 116b of FIG. 7.

Figure 2:
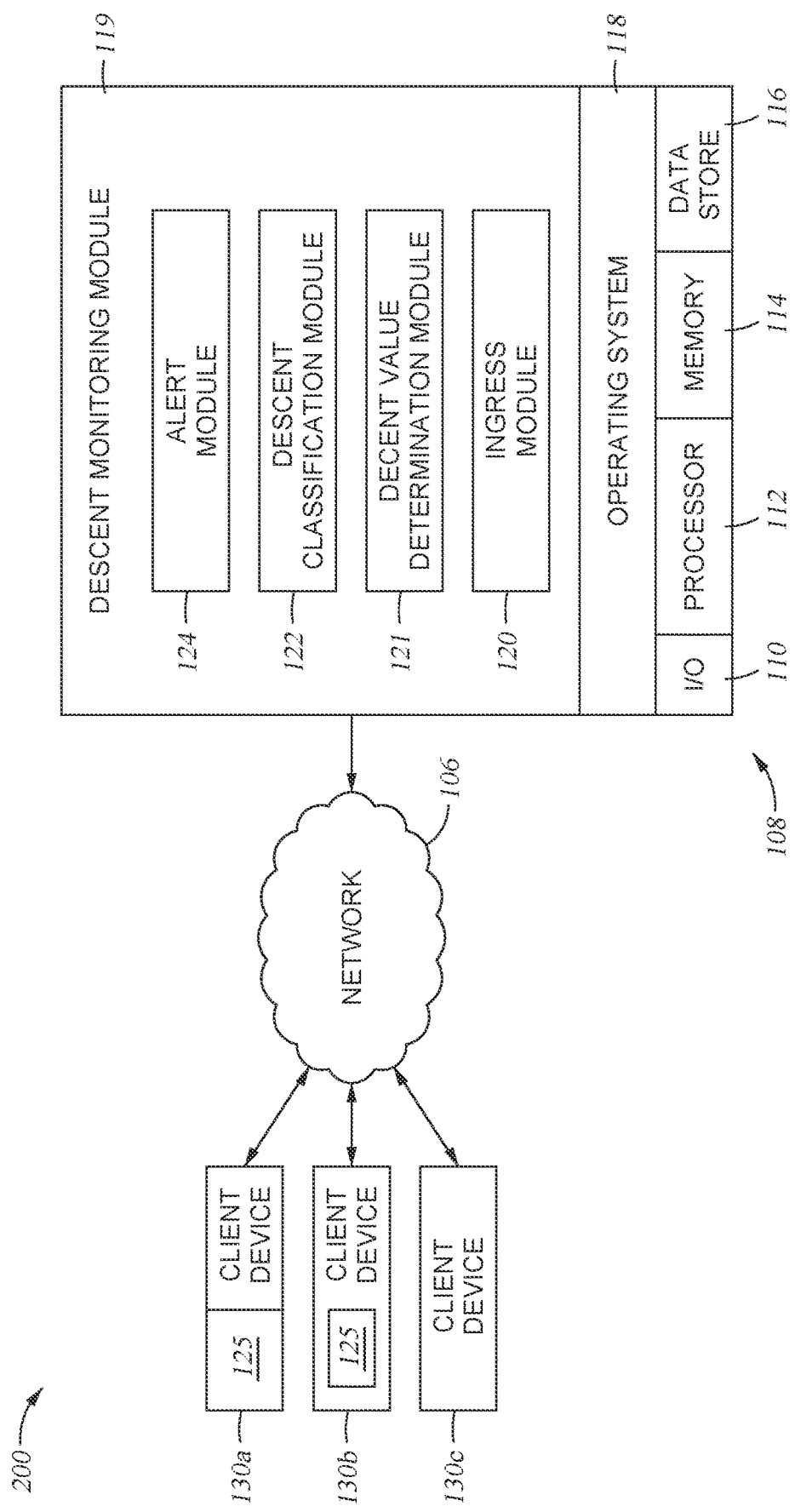
FIG. 2 depicts examples of a flight data processing system.
Figure 11:
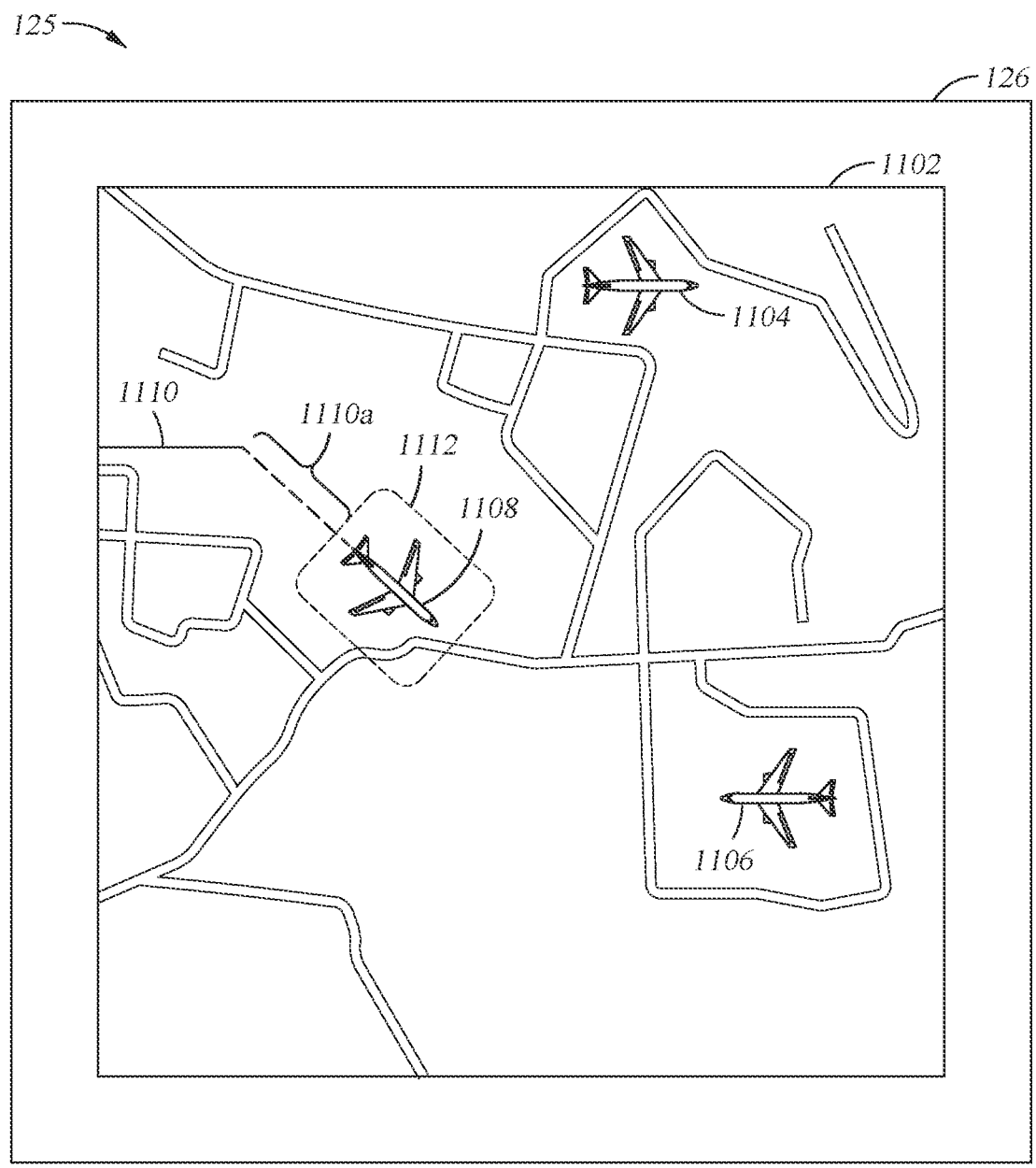
FIG. 11 depicts an example graphical user interface.

FIG. 2 shows flight data processing system 200, which includes client devices 130a, 130b, and 130c. Client devices 130a, 130b, and 130c may receive, from descent monitoring system 108, alert signals, descent classification data, or a combination thereof via network 106. In one aspect, client devices 130a, 130b, and 130c may include mobile devices, laptops, computers, and/or systems thereof. User interface 125 such as a screen or monitor may be detachably coupled to device 130a, and device 130b may include user interface 125. System 108 may provide alert signals, descent classification data, or a combination thereof for generating and displaying an alert on a respective user interface 125. In one aspect, the alert may be provided at a corresponding flight position or more generally arranged on a map, as shown in FIG. 11.

Figure 3:
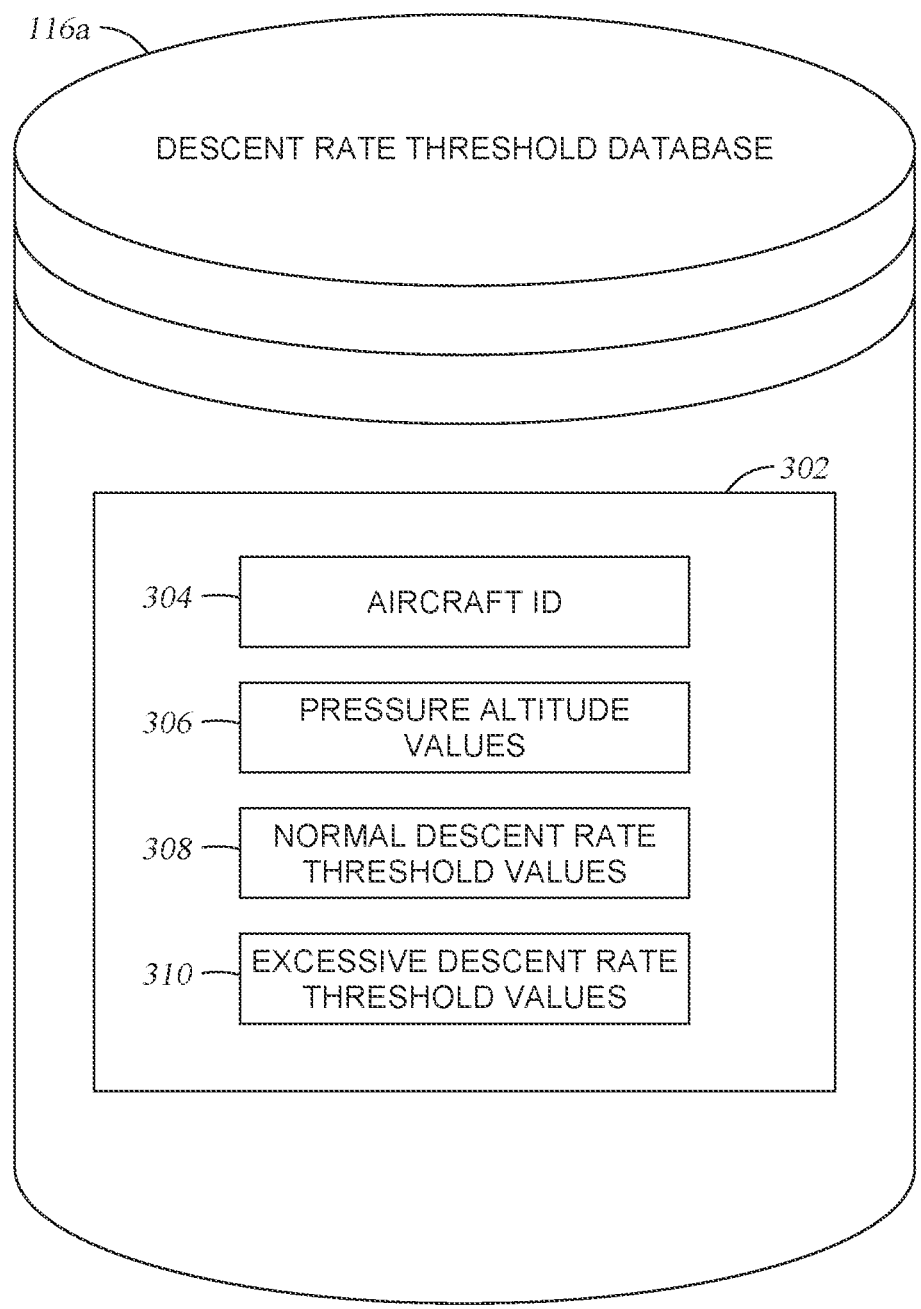
FIG. 3 depicts an example of a descent rate threshold database.

FIG. 3 shows descent rate database 116a, which may be an aspect of data store 116. In one aspect, database 116a includes table 302 with associated values for aircraft ID 304 such as pressure altitude values 306, normal descent rate threshold values 308, and excessive descent rate values 310. In one aspect, aircraft ID 304 includes one or more codes that are defined by the International Civil Aviation Organization (ICAO) and/or the International Air Transport Association (IATA). These codes identify particular aircraft types, models, and variants that may have different performance characteristics. Alternatively, aircraft ID may be a numeral or alpha-numeric ID that maps to or otherwise corresponds to one or more ICAO and/or IATA codes.

In one aspect, each aircraft ID 304 is associated with at least one of threshold values 308 and 310, which are provided for each value of pressure altitude values 306. As explained in more detail, meaningful descent classification can occur independently of a flying aircraft's actual weight and (local) atmospheric temperature, which is not part of ADS-B and similar data.

Pressure altitude values 306 may have a fixed or varying resolution. In one aspect, values 306 are provided for every 100 feet for altitudes of 10,000 feet or higher. In other aspects, altitude resolution may increase as said altitudes approach a lower limit of around 10,000 feet. In one aspect, values 306 may range from an aircraft-specific ceiling altitude to a lower limit of around 10,000 feet. In one aspect, a corresponding value is selected from the pressure altitude values 306 based on a measured pressure altitude value of the ADS-B data. In one aspect, the corresponding pressure altitude value is the value of pressure altitude values 306 that is closest to the measured pressure altitude value. In one aspect, the corresponding pressure altitude value is the value of pressure altitude values 306 that is closest to a (adjusted) measured altitude value from a radar system of other flight data source. In aspect, altitude values may be adjusted based on a measured altitude value and a station pressure.

In one aspect, database 116a may include one of the normal descent rate threshold values 308 and the excessive descent rate threshold values 310. In one aspect, normal descent rate threshold values 308 and the excessive descent rate threshold values 310 may be rate-of-climb (ROC) values and/or rate-of-descent (ROD) values. ROC values generally are negative for characterizing descent rates and ROD values are generally positive for characterizing descent rates (e.g., ROC=-ROD). In one aspect, the excessive descent rate threshold values 310 include rate values that typically do not incur structural damage to an aircraft. That is, in one aspect, the excessive descent rate threshold values 310 may characterize an aircraft speed that is aggressive, but within a performance envelope of an aircraft (e.g., VMO and/or MMO values).

Figure 4:
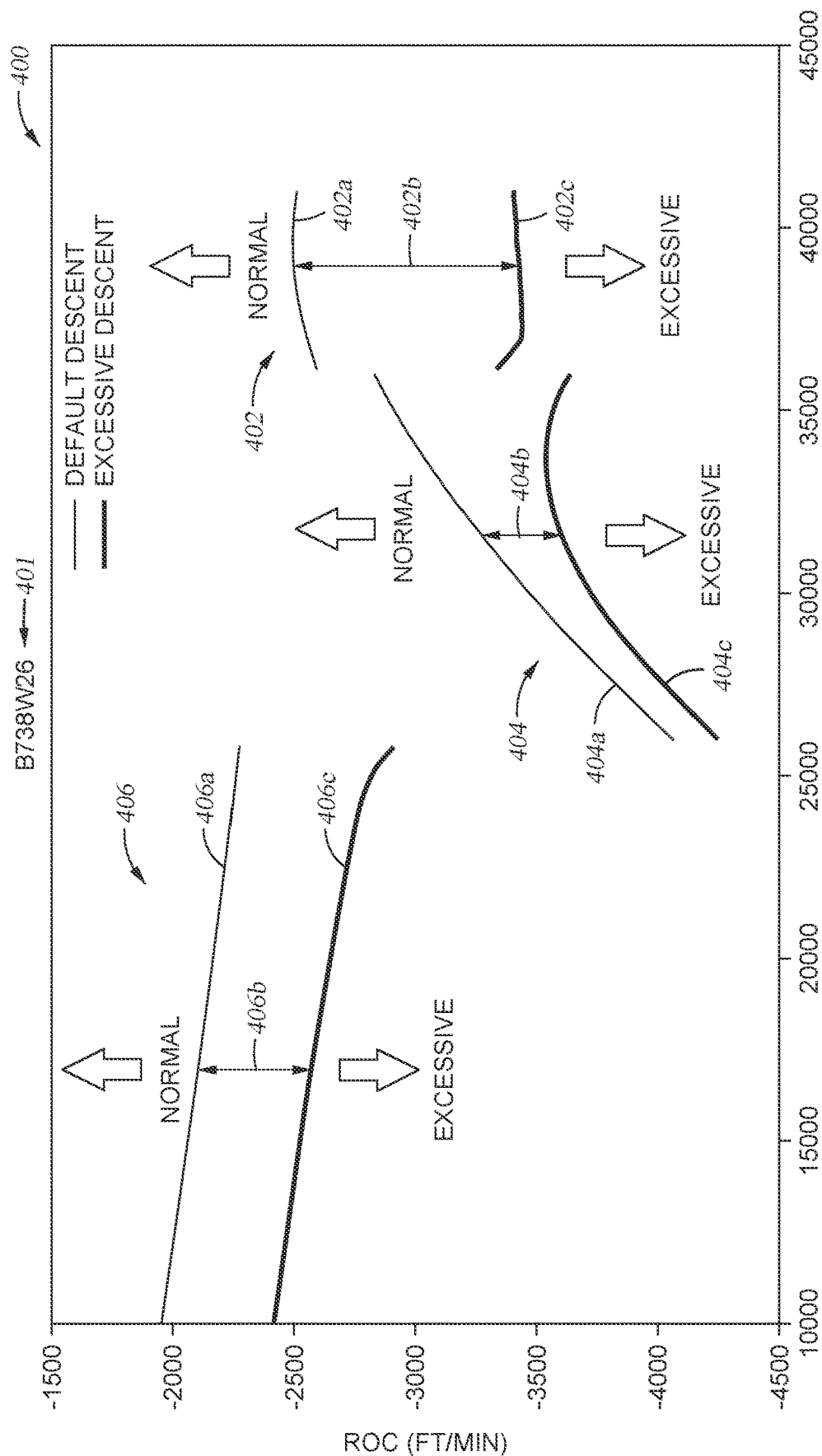
FIGS. 4, 5, and 6 depict examples of descent rate charts.

FIG. 4 includes chart 400, which graphical displays pressure altitude threshold values for aircraft ID 401, "B738W26", which indicates a Boeing 737-800 aircraft model. The vertical axis provides ROC values in feet per minute, which are negative for descents and the horizontal axis provides pressure altitude values from 10,000 feet to more than 40,000 feet (e.g., up to a ceiling altitude of B738W26). The horizontal axis provides pressure altitudes values (Hp).

Chart 400 shows three descent rate schedules 402, 404, and 406, each including a respective normal descent schedule threshold 402a, 404a, and 406a and excessive descent schedule threshold 402c, 404c, and 406c. Each of the descent rate schedules 402, 404, and 406 are specific to a respective range of the pressure altitude values.

Descent rates above normal descent schedule threshold 402a, 404a, and 406a are within a normal range of operation. In one aspect, descent rates arranged between thresholds 402a and 402c, 404a and 404c, or 406a and 406c are intermediate descent rates 402b, 404b, and 406b. In one aspect, intermediate descent rates 402b, 404b, and 406b may cause an alert signal to be generated and generally indicate a rapid or aggressive descent rate, but one that may be within a normal operating procedure depending on an aircraft's weight and configuration and ambient temperature. As such, in one aspect, an alert may be generated for descent rates that equal and/or exceed a corresponding descent rate value of excessive descent schedule thresholds 402c, 404c, and 406c.

Figure 5:
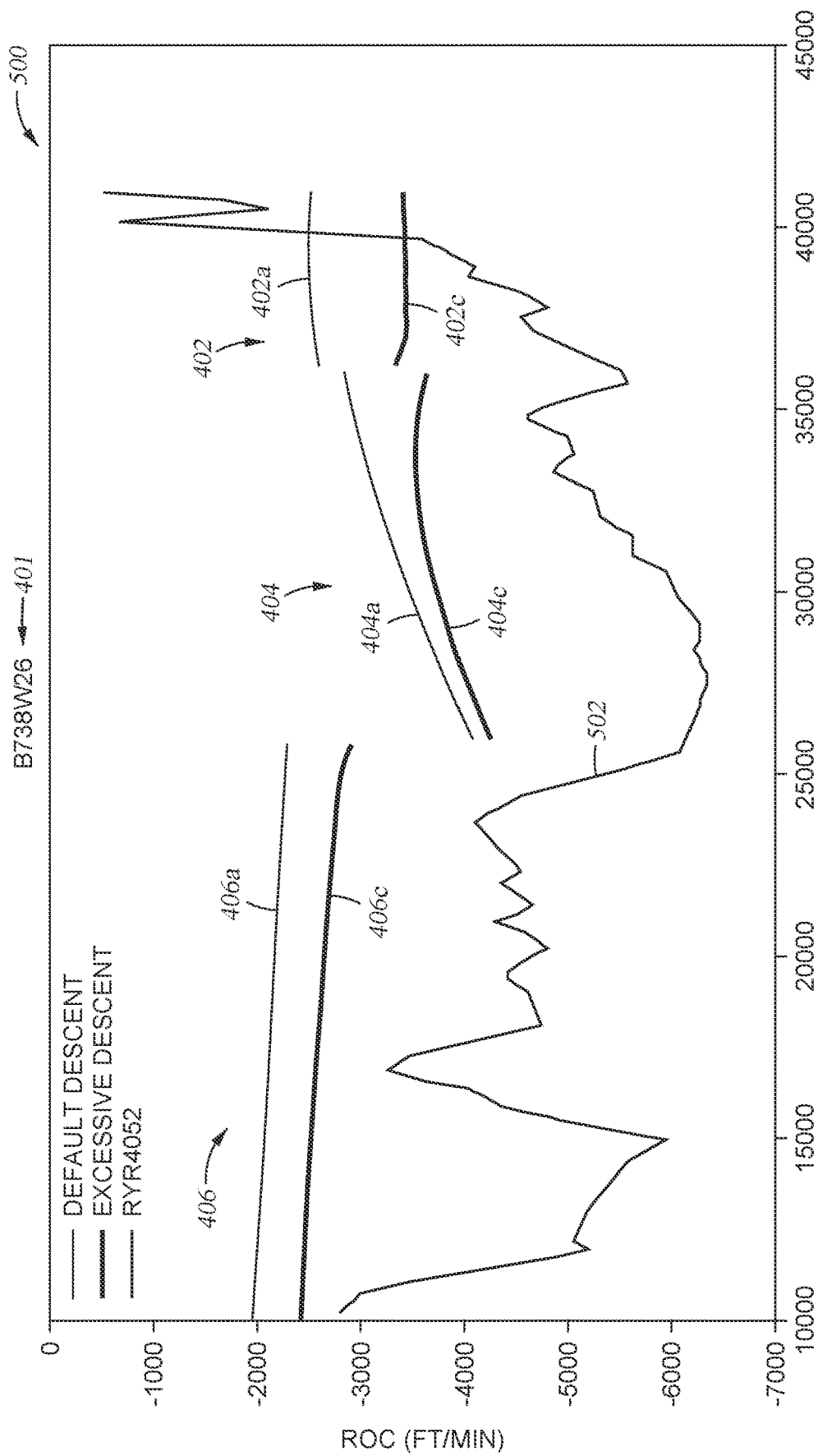

FIG. 5 includes chart 500, which includes reported descent rate 502 and the three descent rate schedules 402, 404, and 406. The reported descent rate 502 is from a B738 aircraft. Chart 500 shows the reported descent rate 502 at each altitude such that the descent path of the aircraft is shown from right to left. Comparing the reported descent rate 502 with the three descent rate schedules 402, 404, and 406 that are stored in a table, most of the values of reported descent rate 502 exceed the respective the excessive descent schedule thresholds 402c, 404c, and 406c. In one aspect, system 108, via alert module 124, provides an alert signal for descent rate values of descent rate 502 that correspond to a pressure altitude of around 39,000 ft and below.

Figure 6:
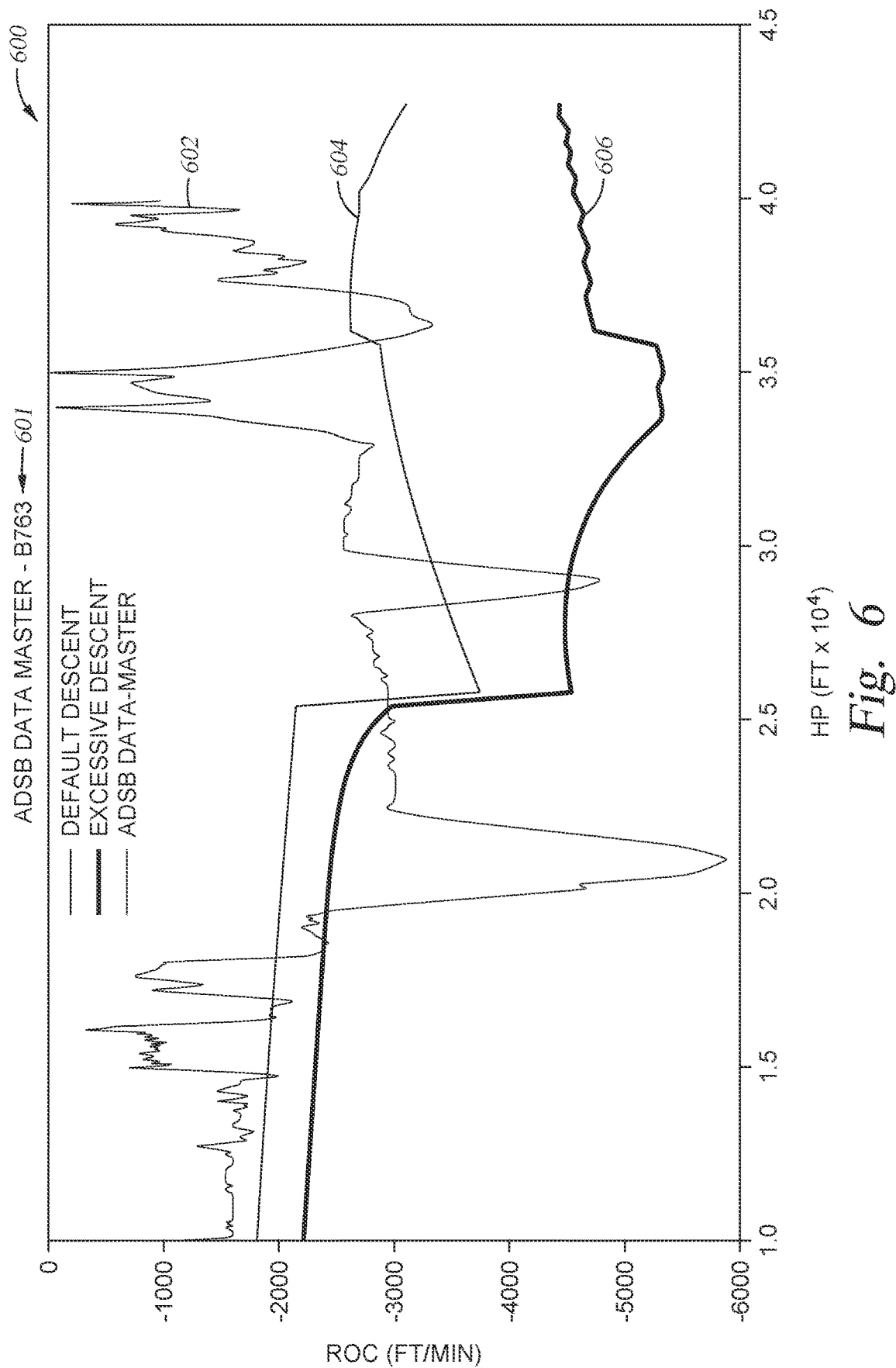

As another example, chart 600 of FIG. 6 shows reported descent rate 602 for an aircraft ID 601 of "B763", which indicates a Boeing 767-300 aircraft model. Chart 600 further shows normal descent schedule threshold 604 and excessive descent schedule thresholds 606. Reported descent rate 602 shows a mix of normal descent rates (e.g., descent rate values above threshold 604), intermediate descent rates (e.g., descent rate values between thresholds 604 and 606), and excessive descent rates (e.g., descent rate values at or below threshold 606).

Figure 7:
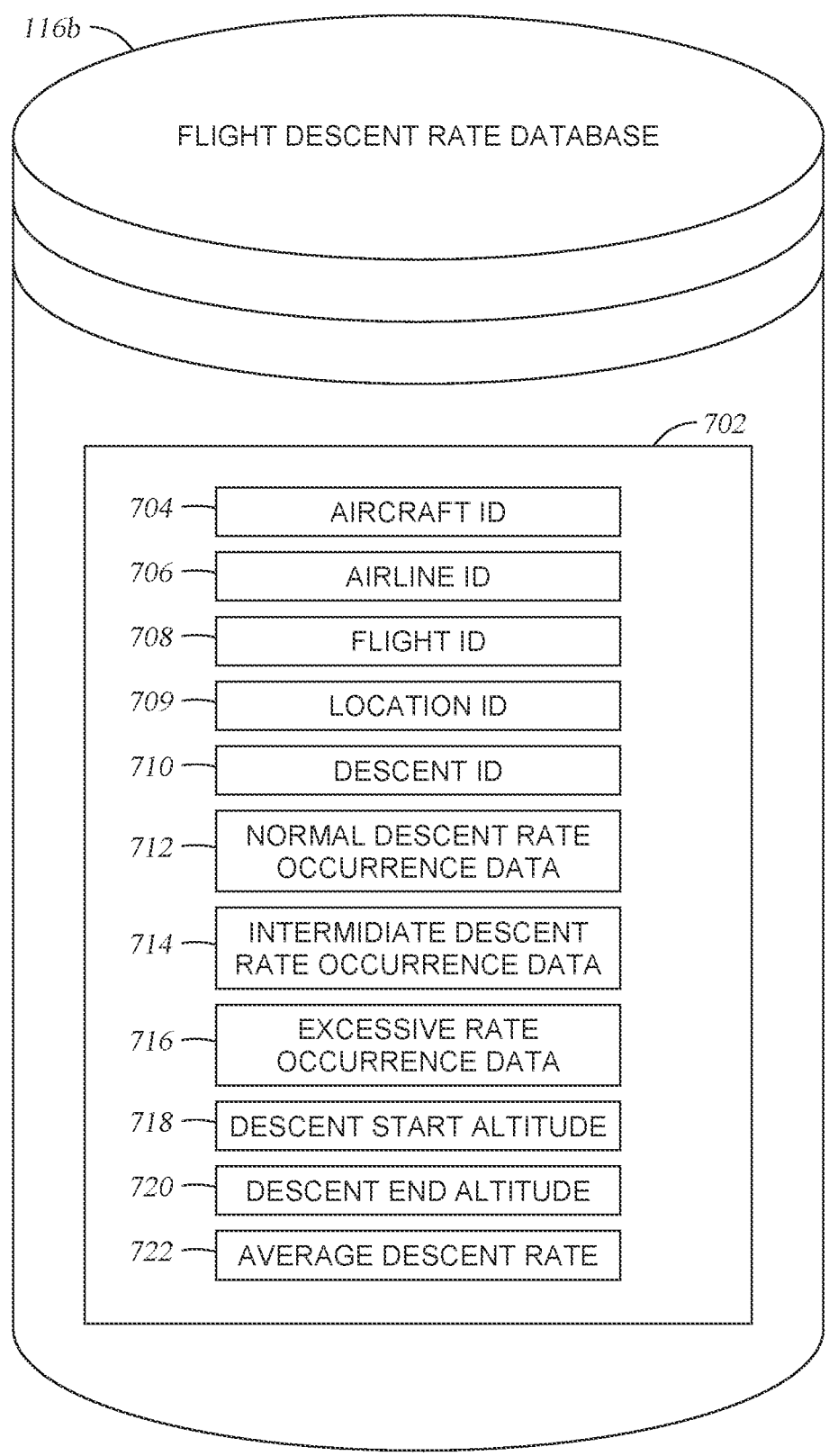
FIG. 7 depicts an example of a flight descent rate database.

FIG. 7 shows flight descent rate database 116b, which may associate, in table 702, descent rate and altitude data with one or more of aircraft ID 704, airline ID 706, flight ID 708, location ID 709, and descent ID 710. Aircraft ID 704 may include one or more ICAO and/or IATA codes. Airline ID 706 may include an ICAO three-letter airline code. Flight ID 708 may be a combination of aircraft ID 704 and airline ID 706, a flight number, or other identifying code. Location ID 709 may include GPS data of an ADS-B message/report, thereby associating descent rate occurrences (e.g., normal, intermediate, and/or excessive rate occurrence data 712, 714, and 716) with airspace locations. In one aspect, descent ID 710 may uniquely identify each descent performed during a flight that is identified by flight ID 708.

Normal, intermediate, and excessive rate occurrence data 712, 714, and 716 may characterize a magnitude or degree that each respective rate occurred, which may be expressed in absolute terms (e.g., number of descent classifications per flight and/or seconds, minutes, hours of descent) and/or relative terms (e.g., as a percentage of a total number of descent occurrences). Descent start altitude 718 may include a pressure altitude that marks (approximately) where an aircraft began a descent and descent end altitude 720 may include a pressure altitude that marks (approximately) where an aircraft ended a descent. Average descent rate 722 may include average values for each descent (e.g., for each descent ID 710), for each flight (e.g., for each flight ID 708), for each airline (e.g., for each airline ID 706), and/or for each aircraft (e.g., for each aircraft ID 704).

In one aspect, one or two of the normal, intermediate, and excessive rate occurrence data 712, 714, and 716 may be included in database 116*b*

Figure 8:
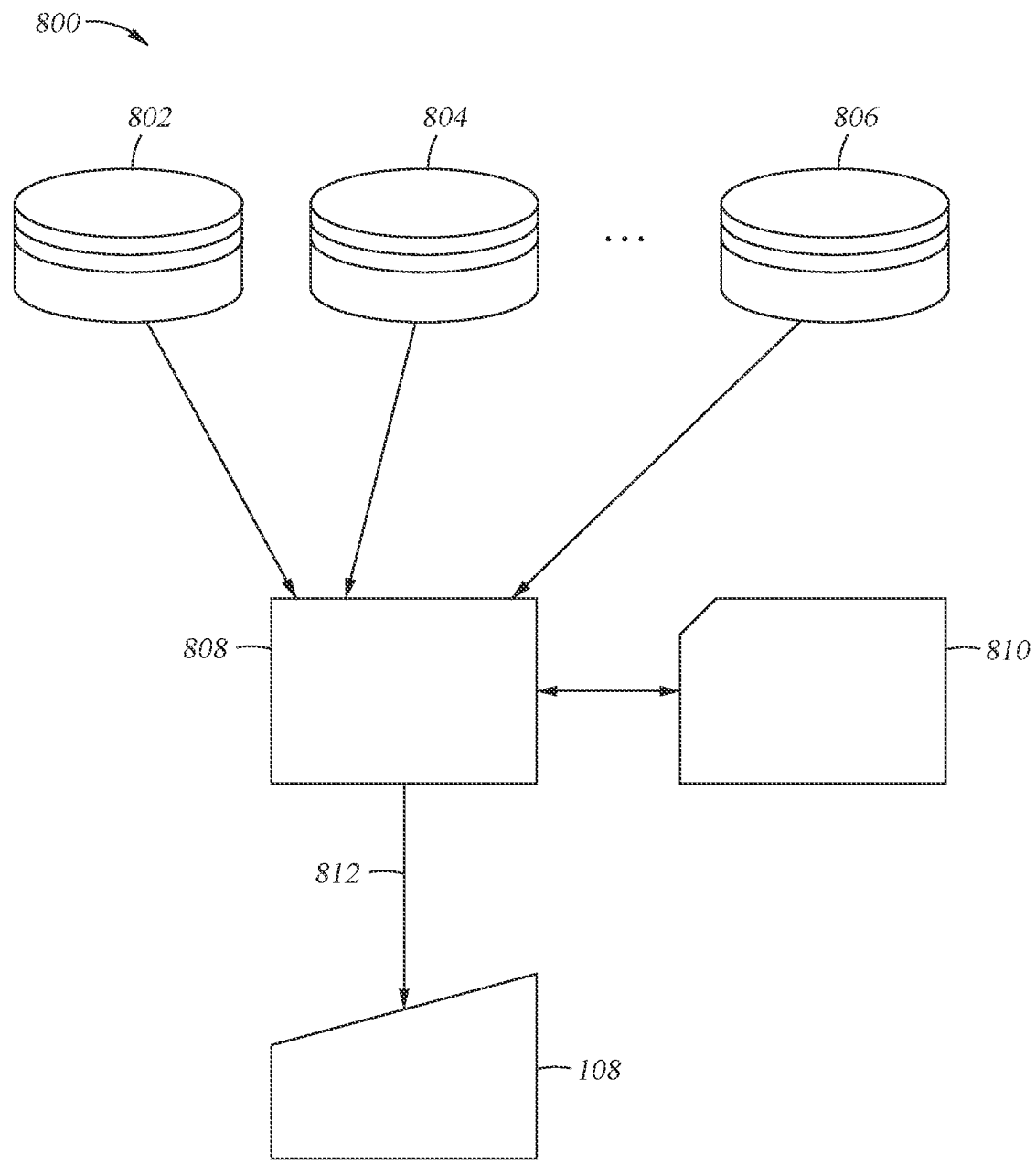
FIG. 8 depicts examples of a descent characterization system.

FIG. 8 depicts examples of descent characterization system 800, which includes aircraft performance databases 802, 804, and 806, which may provide aircraft-specific data for simulator 808, which is operably coupled to trajectory prediction engine 810. Each of the aircraft performance databases 802, 804, and 806 may include aircraft-model specific data that characterizes, among other things, aircraft weight/mass, speed, performance limits (e.g., speed and/or altitude limits), aircraft speed values (e.g., minimum and maximum speeds; a descent rate schedule), and/or performance envelope (e.g., altitude envelope, turn rate envelope, velocity versus load factor).

As explain in more detail below with FIG. 9, simulator 808 and trajectory prediction engine 810 process the aircraft-specific data based on, for example, selected or determined aircraft masses. One innovative insight is that the aircraft-specific maximum takeoff weight and (minimum) operating empty weight values that are provided by aircraft performance databases 802, 804, and 806 typically encompass edge cases that rarely occur. In one aspect, particular weight scenarios are determined and used for calculating a descent rate threshold value. In one aspect, descent rate threshold values are calculated independently of temperature variations.

Simulator 808 then provides aircraft-specific descent data 812 that characterizes one or more descent rate thresholds across a range of pressure altitude values (e.g., a descent schedule threshold). An altitude range may include a depressurized aircraft threshold value, which corresponds to an altitude value having sufficient oxygen density for operating a depressurized aircraft without supplemental oxygen for the crew. A range may alternatively or additionally include a ceiling altitude, which may be an altitude in which an aircraft reaches a zero rate of climb.

Figure 9:
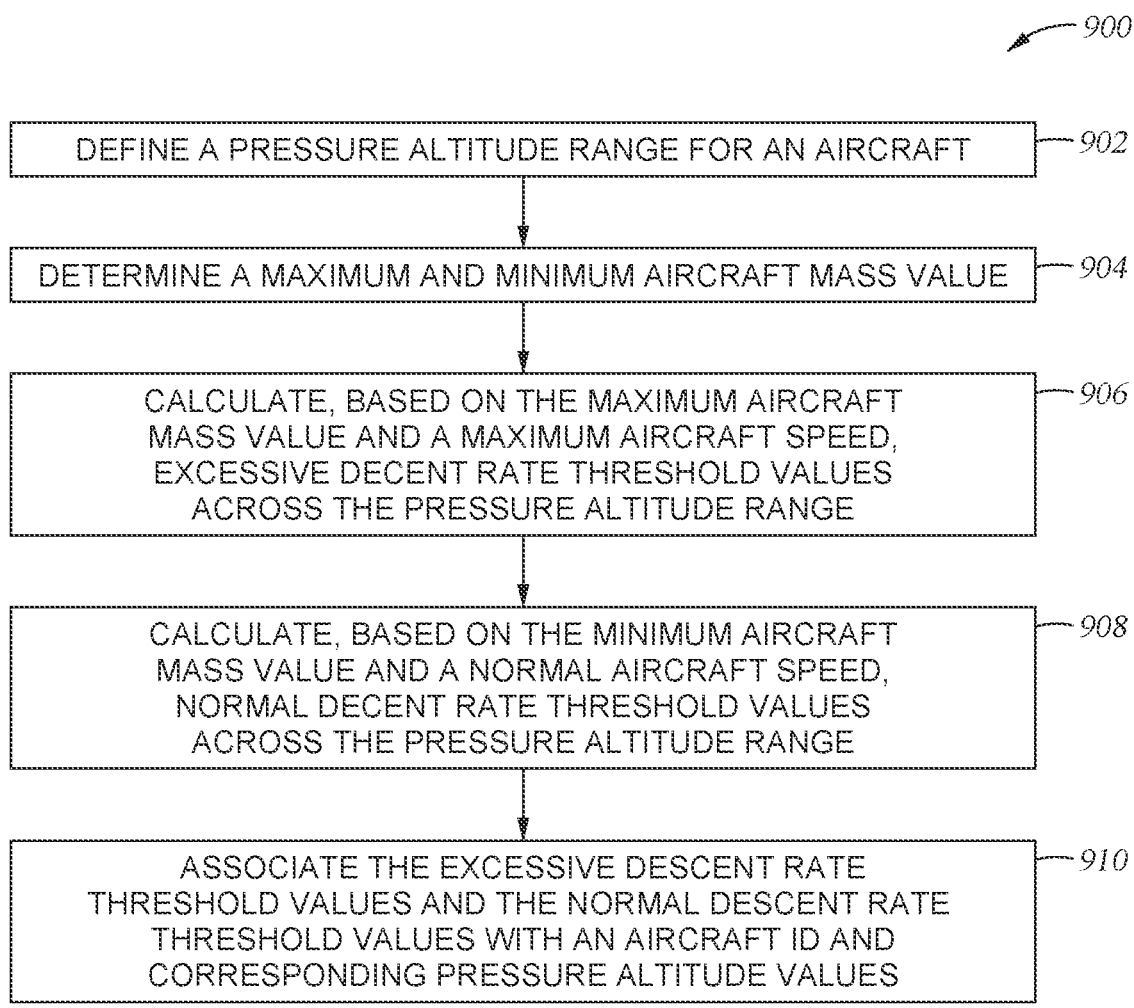
FIG. 9 depicts an example method for providing descent characterization data.

FIG. 9 depicts method 900, which includes, at step 902, defining a pressure altitude range for an aircraft, with examples aspects previously explained. Step 904 includes determining a maximum and minimum aircraft mass value. For example, a maximum aircraft mass value may characterize a weight scenario in which an aircraft, at maximum takeoff weight, has taken off (e.g., performed a climb procedure) and thus burned fuel and is lighter than before takeoff. In one aspect, excessive descent rate threshold values (e.g., aircraft descent rate values) are calculated based on this pre-calculated or otherwise pre-determined (maximum) aircraft weight and a maximum aircraft speed within an aircraft performance envelope (e.g., VMO and MMO values), a maximum aircraft operating speed, and/or a maximum aircraft horizontal speed.

In one aspect, a minimum aircraft mass value may include an aircraft mass that characterizes an aircraft with reserve fuel and 85% of a maximum payload capacity. In one aspect, reserve fuel may be determine based on the amount of fuel for an aircraft to conduct a 45-minute holding pattern and/or fly to an (alternate) airport at a distance of 162 nautical miles. In one aspect, normal descent rate threshold values (e.g., aircraft descent rate values) are calculated based on this (minimum) weight and a normal or default aircraft speed.

Step 906 includes calculating, based on the maximum aircraft mass value and a maximum aircraft speed, an excessive descent rate threshold values across the pressure altitude range. Depending on the altitude, this maximum aircraft speed can be based on a maximum calibrated airspeed ("CAS") (e.g., VMO) or a maximum Mach number (e.g., MMO). The altitude where the CAS and Mach number are equivalent is known as the crossover altitude. Below the crossover altitude, the maximum CAS of a speed schedule is the controlling speed parameter and above the crossover altitude, the Mach number of a speed schedule is the controlling speed parameter.

Step 908 includes calculating, based on the minimum aircraft mass value and a normal aircraft speed (e.g., a horizontal speed of a speed schedule), normal descent rate threshold values across the pressure altitude range. A normal descent rate may be defined by aircraft speed values of a descent schedule that is from an aircraft performance database. Step 910 includes associating the excessive descent rate threshold values and the normal descent rate threshold values with an aircraft ID and corresponding pressure altitude values. In one aspect, corresponding pressure altitude values includes the pressure altitude values used in calculating the descent rate threshold values. In one aspect, one or more of the excessive descent rate threshold values and/or the normal descent rate threshold values are associated in a data store.

Figure 10:
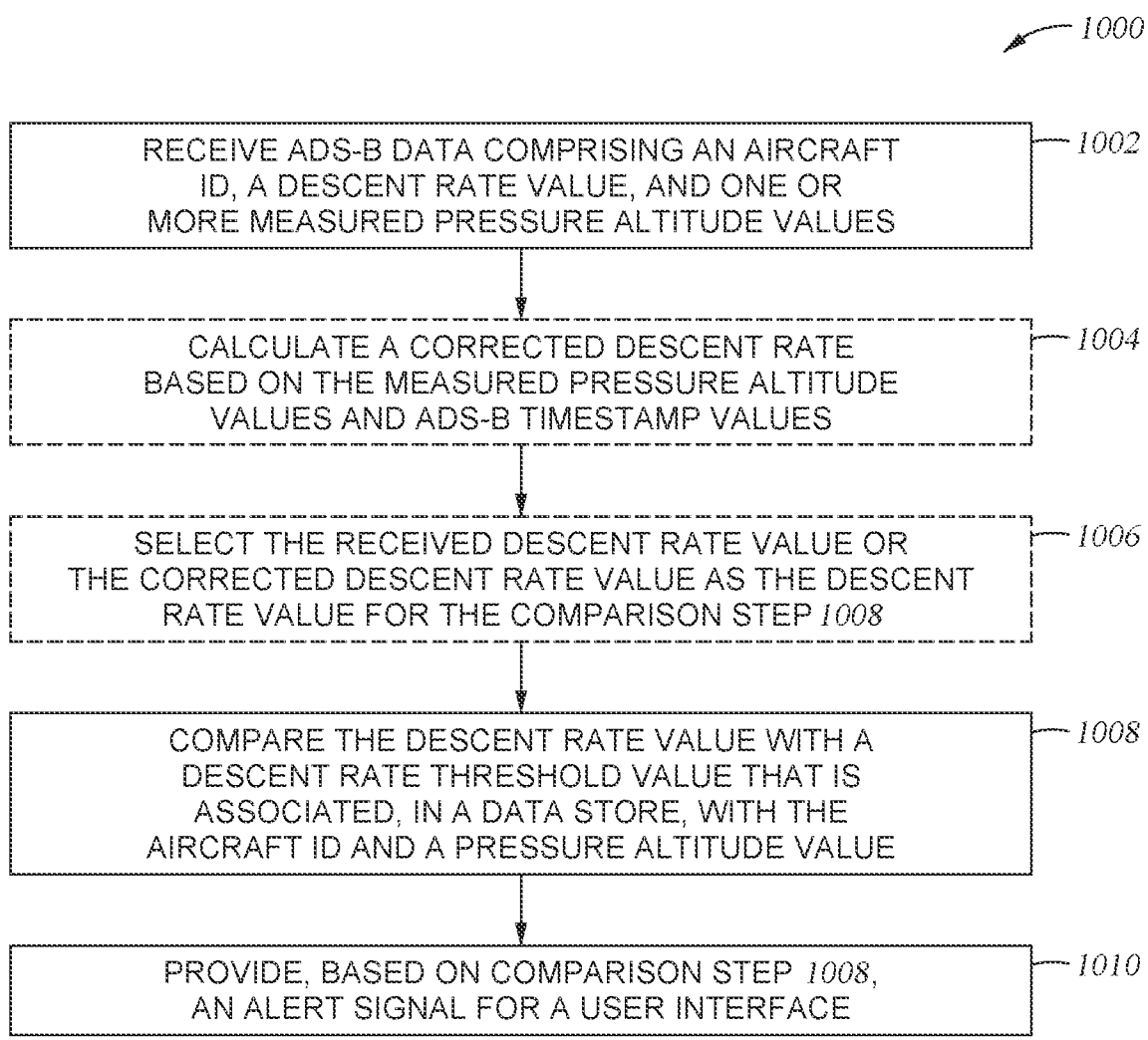
FIG. 10 depicts example methods for monitoring descent data.

FIG. 10 depicts example method 1000, which includes, at step 1002, receiving ADS-B data comprising an aircraft ID, a descent rate value, and one or more measured pressure altitude values. Optional step 1004 includes calculating a corrected descent rate value based on the measured pressure altitude values and ADS-B timestamp values and optional step 1006 includes selecting the received descent rate value or the corrected descent rate value as the descent rate value for the comparison step 1008.

To explain further, ADS-B data may be transmitted in noisy environments, which may introduce inaccuracies to the data. In one aspect, steps 1004 and 1006 check the consistency of received descent rate data. For example, step 1004 may calculate a difference of pressure altitude values associated with different timestamps. A corrected descent rate value can then be based on the pressure altitude difference and time value difference between corresponding timestamps.

Step 1006 may then select one of the corrected descent rate and the received descent rate values according to a difference value that is based on, for example, a subtraction operation or division operation (e.g., the calculated or received descent rate divided by a sum of said rates). Based on the difference value (or a corresponding similarity value), the corrected descent rate value may be selected if the received descent rate value has, for example, more than a 20% difference from the corrected descent rate value. In one aspect, the received descent rate value is selected if it has a value that is within a 20% difference threshold based on the corrected descent rate value. Alternatively, the descent rate of step 1002 is provided to comparison step 1008 without performing steps 1004 and 1006.

At step 1008, the (corrected or received) descent rate value is compared with a descent rate threshold value. The descent rate threshold value is associated, in a data store, with the aircraft ID and a pressure altitude value. In one aspect, the pressure altitude value corresponds to the measured pressure altitude value as being the closest match in value (e.g., a 1200 feet pressure altitude value of a data store being closest to a measured pressure altitude value of 1221 feet, with the next closest pressure altitude values being 1100 and 1300 feet).

Step 1010 includes providing, based on the comparison step 1008, an alert signal for a user interface such as graphic user interface. Example alerts are shown in FIG. 11, which depicts display unit 126 of user interface 125. Display unit 126 provides map 1102 with icons of aircraft 1104, 1106, and 1108. In one aspect, flight track 1110 may include alert track portion 1110a to indicate excessive descent rates. In one aspect, an icon of aircraft 1108 may increase in size in response to an excessive descent rate classification. In one aspect, said increase in size may be proportionate to a degree that a descent rate exceeds a normal and/or excessive descent rate threshold. In one aspect, visual alert 1112 may be arrange at a location of map 1102 that corresponds to received ADS-B location data of a received or determined descent rate that exceeds a normal and/or excessive descent rate threshold.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method comprising:
receiving, by a processor via an ingress module, automatic dependent surveillance-broadcast (ADS-B) data comprising a table related to an aircraft ID, a descent rate value, and a measured pressure altitude value;
comparing, in real time by the processor via a descent classification module, at least the descent rate value with a descent rate threshold value that is associated, in a data store, with the table related to the aircraft ID and a pressure altitude value, the descent rate threshold value based on an aircraft mass value and an aircraft speed value; and
providing, in real time by the processor via an alert module and based on the comparing step, an alert signal for a graphic user interface GUI.

2. The method of claim 1, wherein the descent rate threshold value includes at least one of a rate-of-climb threshold value and a rate-of-descent threshold value.

3. The method of claim 1, wherein the providing step comprises providing, in response to at least the descent rate value exceeding the descent rate threshold value, the alert signal for the GUI.

4. The method of claim 1, wherein the providing step comprises providing, in response to the descent rate data equaling or exceeding the descent rate threshold value, the alert signal for the GUI.

5. The method of claim 1 further comprising selecting with the processor, from a data store, the descent rate threshold value based on the aircraft ID and the measured pressure altitude value.

6. The method of claim 1, wherein the providing step comprises providing, in response to the comparing step, at least one of a visual alert signal and an auditory alert signal for the GUI.

7. The method of claim 6, wherein the providing step comprises providing, in response to the comparing step, at least one of the visual alert signal and the auditory alert signal having a variable parameter with respect to a degree that the descent rate value exceeds the descent rate threshold value.

8. The method of claim 1 further comprising displaying, by a display unit, a map and the providing step comprising providing, by the alert module, a visual alert that is displayed with the map.

9. The method of claim 8 with the ADS-B data further comprising location data and the providing step comprising providing, by the processor via the alert module, the visual alert that is displayed at a location of the map that corresponds to the location data.

10. The method of claim 1 further comprising displaying, by a display unit, a flight track based on the ADS-B data and the providing step comprising providing, by the processor via the alert module, a visual alert that is displayed along the flight track.

11. The method of claim 1, wherein the receiving step comprises receiving, by the ingress module, the ADS-B data comprising the aircraft ID, the descent rate value, measured pressure values, and timestamp values, the measured pressure values associated with the timestamp values and the method further comprising:
calculating, by a descent value determination module and based on the measured pressure values, a corrected descent rate value based on the measured pressure values associated with the timestamp values; and
selecting, by the descent value determination module, the descent rate value or the corrected descent rate value based on a difference value between the descent rate value and the corrected descent rate value, wherein the comparing step comprises comparing, in response to the selecting step selecting the corrected descent rate value, the corrected descent rate value with the descent rate threshold value.

12. The method of claim 1, wherein the receiving step comprises receiving, by the ingress module, an ADS-B data stream comprising the ADS-B data associated with a plurality of flights, the ADS-B data comprising aircraft IDs that each identify an aircraft model, descent rate values, and measured pressure altitude values,
the comparing step comprises comparing, by the descent classification module, at least the descent rate values with descent rate threshold values that are associated, in the data store, with a respective aircraft ID and pressure altitude values.

13. The method of claim 12, wherein the pressure altitude values, associated with the respective aircraft ID, comprise a range that includes at least one of a ceiling altitude value and a depressurized aircraft threshold altitude value.

14. The method of claim 12, wherein the descent rate threshold values, associated with the respective aircraft ID, are calculated based at least on a descent rate schedule of the aircraft model for altitudes of ten-thousand feet or higher.

15. The method of claim 1, wherein the aircraft mass value is below a pre-defined maximum takeoff weight of an aircraft model and above a pre-defined operating empty weight of the aircraft model.

16. The method of claim 1, wherein the comparing step comprises comparing at least the descent rate value with one or more descent rate threshold values that are calculated based at least on the aircraft mass value and aircraft speed values that characterize a descent of an aircraft model that corresponds to the aircraft ID.

17. The method of claim 1, wherein the comparing step comprises comparing at least the descent rate value with one or more descent rate threshold values that are calculated based at least on one of the aircraft speed value that characterizes a maximum operating speed of an aircraft model, and the aircraft mass value that characterizes a weight of the aircraft model after at least a takeoff procedure.

18. The method of claim 1, wherein the comparing step comprises comparing at least the descent rate value with one or more descent rate threshold values that are calculated based at least on the aircraft mass value that characterizes a payload weight that is lighter than a maximum payload capacity weight of an aircraft model.

19. The method of claim 1, wherein the comparing step comprises comparing at least the descent rate value with one or more descent rate threshold values that are calculated based at least on a descent rate schedule of an aircraft model for altitudes of ten-thousand feet or higher.

20. The method of claim 1, wherein the descent rate threshold value comprises at least one of a normal descent rate threshold and an excessive descent rate threshold.

21. The method of claim 20 further comprising storing, based on the comparing step and in the data store, at least one of normal descent rate occurrence data and excessive descent rate occurrence data.

22. The method of claim 1, wherein the comparing step comprises comparing, by the descent classification module, at least the descent rate value with a normal descent rate threshold value and an excessive descent rate threshold value that are each associated, in the data store, with the aircraft ID and the pressure altitude value, the normal descent rate threshold value based on a normal descent rate value and the excessive descent rate threshold value based on an excessive descent rate value.

23. The method of claim 22 further comprising storing, based on the comparing step and in the data store, at least one of normal descent rate occurrence data, intermediate descent rate occurrence data, and excessive descent rate occurrence data.

24. A system comprising:
a data store having tables related to corresponding aircraft IDs that each identify a respective aircraft model, each of the aircraft IDs associated, in the data store, with descent rate threshold values of the respective aircraft model, the descent rate threshold values associated, in the data store, with pressure altitude values;
a processor implementing computer program instructions stored within the data store and configured to:
receive, based on the computer program instructions from an ingress module, at least a data stream of automatic dependent surveillance-broadcast (ADS-B) data of a plurality of flights, the ADS-B data comprising reported aircraft IDs, descent rate values, and reported pressure altitude values;
compare, in real time based on the computer program instructions from a descent classification module, at least the descent rate values with corresponding descent rate threshold values that are associated, in the data store, with the tables of the aircraft IDs that correspond to the reported aircraft IDs and the pressure altitude values that correspond to the reported pressure altitude values; and
in response to the descent classification module comparing at least one of the reported descent rate values that exceeds at least one of the corresponding descent rate threshold values, provide, in real time based on the computer program instructions from an alert module, an alert signal for a graphic user interface.

25. A system comprising:
a data store having descent rate threshold values of at least one aircraft model, the descent rate threshold values associated, in the data store, with pressure altitude values that include a pressure altitude value from a table;
a processor implementing computer program instructions stored within the data store and configured to:
receive, based on the computer program instructions from an ingress module, flight data comprising a descent rate value and an altitude value;
compare, in real time based on the computer program instructions from a descent classification module, the descent rate value with at least one of the descent rate threshold values that is associated, in the data store, with the pressure altitude value that corresponds to the altitude value from the table;
in response to comparing the descent rate value that exceeds the at least one of the descent rate threshold values, provide, in real time based on computer program instructions from an alert module, an alert signal to a graphic user interface; and
the graphic user interface operably coupled to the alert module.

* * * * *